United States Patent
Frank

[11] Patent Number: 5,887,617
[45] Date of Patent: Mar. 30, 1999

[54] FUEL SUPPLY DEVICE

[75] Inventor: Kurt Frank, Schorndorf, Germany

[73] Assignee: Robert Bosch GmbH, Stuttgart, Germany

[21] Appl. No.: 668,926

[22] Filed: Jun. 24, 1996

[30] Foreign Application Priority Data

Aug. 26, 1995 [DE] Germany ............... 195 31 424.7

[51] Int. Cl.[6] .................................................. F02M 29/00
[52] U.S. Cl. ........................ 137/574; 137/315; 137/565; 137/576; 123/509; 123/514
[58] Field of Search .................... 123/509, 514; 137/565, 574, 576, 566, 315

[56] References Cited

U.S. PATENT DOCUMENTS

| 2,395,661 | 2/1946 | Heckert . | |
| 2,530,457 | 11/1950 | Kately et al. . | |
| 2,953,156 | 9/1960 | Bryant | 137/576 |
| 4,869,225 | 9/1989 | Nagata et al. | 123/514 |
| 4,926,829 | 5/1990 | Tuckey | 123/514 |
| 5,038,741 | 8/1991 | Tuckey | 137/576 |
| 5,058,557 | 10/1991 | Frank et al. | 137/576 |
| 5,111,844 | 5/1992 | Emmert et al. | 137/574 |
| 5,170,764 | 12/1992 | Tuckey | 123/509 |

FOREIGN PATENT DOCUMENTS

4103920A1  8/1992  Germany .

Primary Examiner—A. Michael Chambers
Attorney, Agent, or Firm—Michael J. Striker

[57] ABSTRACT

A fuel supply device has a container from which fuel is to be supplied to an internal combustion engine, a receptacle, a fuel feeding aggregate arranged on the receptacle, a connecting unit for receiving electrical and hydraulic connecting elements. The fuel container has a lower side provided with an opening, and the fuel feeding aggregate is insertable in the opening of the lower side of the fuel container.

4 Claims, 1 Drawing Sheet

FUEL SUPPLY DEVICE

BACKGROUND OF THE INVENTION

The present invention relates to a fuel supply device for the fuel container from which fuel is supplied to an internal combustion engine.

Fuel supply devices for the above mentioned general type are known in the art. Upon such fuel supply devices disclosed in the German Document G4103920A1. It has a fuel container for storing fuel and an auxiliary container in which the fuel container is insertable to store a part of the fuel. The auxiliary container has a receptacle for positioning a fuel feeding aggregate. A tank flange is provided on the upper side of the auxiliary container and supports the auxiliary container in the fuel tank. The tank flange has connecting devices for electrical and hydraulic connection conduits. For filling the auxiliary container with fuel, a pump is provided in its lower region and supplied with fuel into the auxiliary container. It is controllable via a measuring device to obtain a predetermined level of the fuel to be supplied in the auxiliary container. Such an arrangement which is insertable from above in the fuel container requires a relatively accurate dimensioning of the corresponding parts to arrange the pump for the auxiliary container or for the fuel feeding aggregate near a bottom of the fuel container, so as to make available the complete volume of the fuel container for feeding to an internal combustion engine.

SUMMARY OF THE INVENTION

Accordingly, it is an object of the present invention to provide a fuel supply device which avoids the disadvantages of the prior art.

In keeping with these objects and the others which will become apparent hereinafter, one feature of the present invention, resides, briefly stated, in a fuel supply container of the above mentioned general type, in which the fuel feeding aggregate is insertable in an opening arranged on a lower side of the fuel container.

With the fuel supply aggregated designed in accordance with the present invention, it has a simple and cost-favorable arrangement for mounting of a fuel feeding aggregate in the fuel container, in which a location of the fuel feeding aggregate close to the bottom in the fuel container is possible. Because of the insertion from below in the fuel container, a compensation and other expective connecting technique and constructions for bottom-close position of the fuel feeding aggregate in the fuel container are dispensed with. In addition, due to insertion of the fuel feeding aggregate from the lower side of the fuel container, a simple and fast engagement of the electrical and hydraulic connecting conduits with the connecting devices arranged on the lower side of the fuel container is provided.

In accordance with another advantageous feature of the present invention, on the receptacle which supports a fuel feeding aggregate, a tank flange is provided and is insertable as a tank insert unit from below into the opening of the fuel container. The tank insert unit has a receptacle for fuel feeding aggregate which is formed on the tank flange. On the lower side of the fuel container, the tank insert unit can be insertable into an opening and therefore abut with the tank flange against the lower side of the fuel container to be fixed. In repair and service cases, an exchange of the fuel feeding aggregate can be performed in a simple manner after releasing a connecting between the tank flange and the lower side of the fuel container.

In accordance with a further advantageous feature of the present invention, an auxiliary container is provided on the tank flange. It surrounds the fuel feeding aggregate at least partially and extends over the length of the fuel feeding aggregate. In accordance with this embodiment, the tank insert unit has the auxiliary container in which fuel can be also stored. Advantageously a suction jet pump is provided which feeds the fuel from the fuel container into the auxiliary container. It can operate in a long-term operation, while excessively fed fuel exits the auxiliary container and flows back into the fuel container. Alternatively, the suction jet pump can communicate with a tank level sensor to provide a predetermined level of the fuel stored in the auxiliary container.

The auxiliary container serves preferably as an over flow trough. Thereby it is guaranteed that in extreme situations such as fast curve travels or travels on paths or routes with high increase or sharp fall when the fuel container is at least partially emptied, a reliable feeding of the fuel to the internal combustion engine can be provided.

In a further embodiment of the present invention, the opening of the fuel container is provided with an inwardly extending wall portion which, in the mounted condition of the tank insert, forms an auxiliary container surrounding the fuel feeding aggregate. The arrangement of the inwardly extending wall portion in the opening on the lower side of the fuel container provides an alternative embodiment for forming the auxiliary container for the tank insert unit.

Finally, in accordance with a further embodiment of the present invention, the auxiliary container has a pump which feeds the fuel from the fuel container into the auxiliary container. The opening of the fuel container can be also provided with an edge region which extends back relative to its lower side by at least the thickness of the tank flange and limits the opening. With such a construction, a plane lower side of the fuel container is provided. Simultaneously, a prefixing or definite positioning or the tank insert in the opening of the fuel container is possible over the extending back edge region of the opening.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
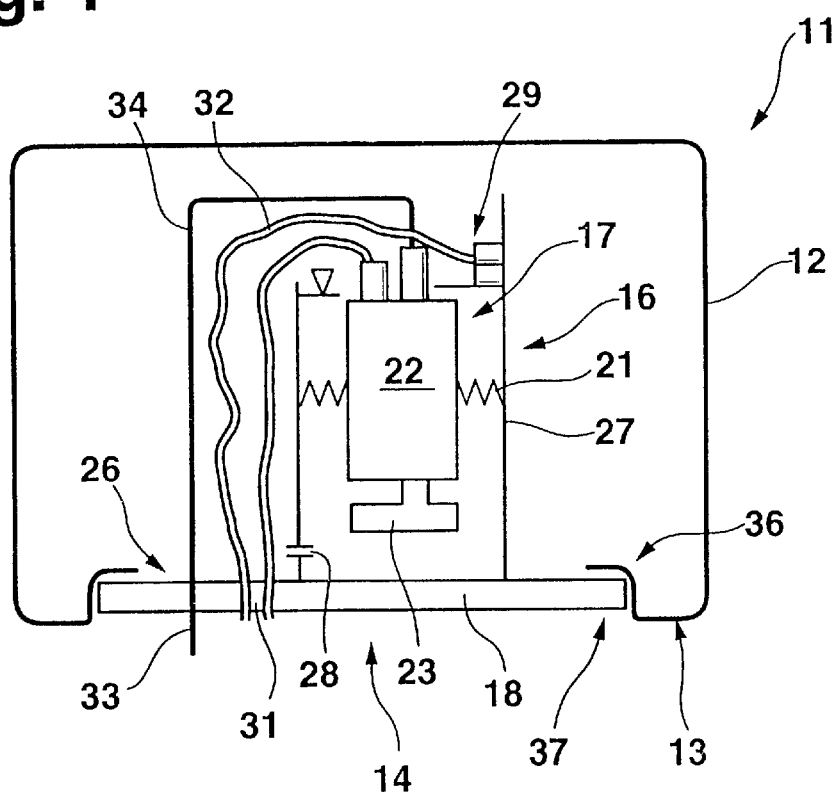
FIG. 1 is a view schematically showing a fuel supply device in accordance with the present invention.

FIG. 1 shows a fuel supply device 11 provided with a fuel container 12 for storing fuel to be supplied to a not shown internal combustion engine. A tank insert unit 14 is arranged on a lower side 13 of the fuel container 12 and is fixed to the fuel container.

The tank insert unit 14 has a receptacle 16, via which a fuel feeding aggregate 17 is arranged in a predetermined position near a tank flange 18 formed on the receptacle 16. The receptacle 16 is formed a cylindrical container 27. A holder 21 is provided between the auxiliary container 27 and the fuel feeding aggregate 17 and receives the fuel feeding aggregates 17 in vibration-insulating manner. The cylindrical container 27 extends substantially over the whole length of the fuel feeding aggregate 17 and is open upwardly. Thereby the auxiliary container 27 is formed, which forms an overflow trough for the fuel feeding aggregate 17.

Alternatively, the receptacle 16 can be provided with holding elements 19 arranged substantially perpendicular to the tank flange 18 and formed as bars or the like. The holders 21 are formed on the holding elements 19. They at least partially surround the fuel feeding aggregate 17 and received in a vibration-insulating manner. The holding elements 19 can form first vibration insulating means, while the holders 21 can form second vibration insulating means so as to fix the fuel feeding aggregate 17 substantially vibration-free in the fuel container 12. The receptacle 16 is arranged inside the over-flow trough.

Because of the above mentioned design of the tank insert 14, a height compensation for a deep arrangement of the fuel feeding aggregate 17 near the bottom in the fuel container 12 can be dispensed with. In the prior art, such a height compensation was necessary and it required corresponding tolerances of the components of the fuel supply device 11.

The fuel feeding aggregate 17 has a flow pump 22 with a preliminary sieve 23 mounted on its lower side. The fuel feeding aggregates 17 is received through the receptacle 16 in the tank insert unit 14 so that the preliminary sieve 23 is located near the tank flange 18, and a maximum deep location of the fuel container 12 of the fuel feeding aggregate 17 is provided.

Furthermore, due to the insertion of the tank insert unit 14 in an opening 26 on the lower side 17 of the fuel container 12, a height compensation for the fuel feeding aggregates 17 in the container 12 can be dispensed with. The tank insert unit 14 is thereby arranged in an optimal insertion position.

Fuel is also stored in the auxiliary container 27. It is supplied by pump 28, formed for example as a suction jet pump, into the auxiliary container 27. The suction jet pump 28 can operate over a long time and the excessively supplied fuel can flow out from the upwardly opened auxiliary container 27. This provides a structurally simple and cost favorable embodiment.

Alternatively, a detecting device 29 can be provided in an upper portion of the auxiliary container 27, for communication with the pump 28 to obtain a predetermined level of the fuel stored in the auxiliary container 27. A simple control can be provided such that the suction jet pump 28 feeds fuel until the level of the fuel in the auxiliary container 27 reaches the detecting device 29. The latter can be formed preferably as a sensor.

A connecting device 31 for electrical connecting conductors is provided on the tank flange 18. The electrical connecting conductors are connectable with electrical connecting conductors located outside of the fuel container 12. Also, the tank flange 18 has a connecting device 33 for a hydraulic connecting conduit which is connectable with a feeding conduit for supplying the fuel from the fuel container 12 to an internal combustion engine. Furthermore, a further connecting device 33 can be provided for a hydraulic connection conduit 34 operating as a return conduit in the case of an internal combustion engine with a motor through flushing.

The fuel container 12 has a projection provided in an edge region 36 which adjoins the opening 26. The projection substantially corresponds to the thickness of the outer edge zone 37 of the tank flange 18. Thereby the lower sides 13 of the fuel container 12 in a mounted condition can form a plane surface with the tank insert unit 14. Simultaneously, the edge region 36 is formed with such a size that the tank flange 18 is arrangeable in the edge region in a predetermined position.

The tank flange 18 is fixed with its edge zone 37 to the edge region 36 through connections which are known in the art. At least a fluid-tight and a vapor-tight connection is provided, which can be formed as a force-transmitting, form-locking or a unitary material connection.

The components which form the tank insert unit 14, such as the receptacle 16, the tank flange 18, the auxiliaries container 27, can be formed preferably of one piece with one another as an integral injection molded part.

Figure 2:
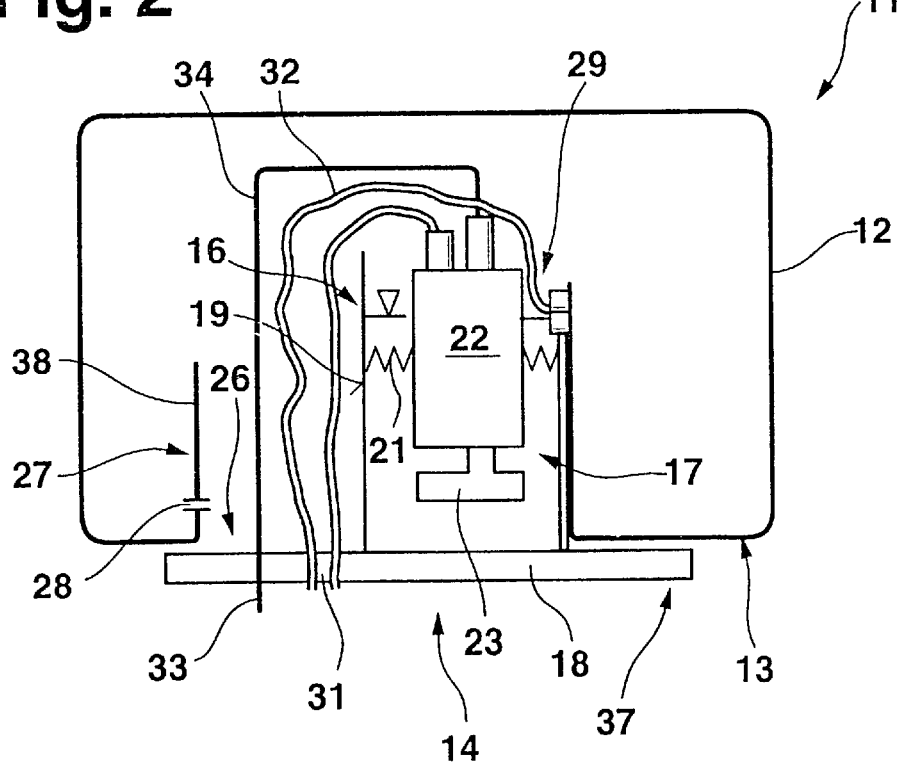
FIG. 2 is a view schematically showing an alternative embodiment of the inventive fuel supply device.

FIG. 2 shows an alternative embodiment of the fuel supply device 11 with the fuel container 12. The tank insert unit 14 corresponds substantially to the tank insert unit 14 of FIG. 1, with the exception of an auxiliary container 27 arranged on the tank flange 18.

In this embodiment the auxiliary container 27 is formed by a wall portion adjoining the opening 26 of the fuel container 12. It is provided at a lower side 13 of the fuel container 12 and extends substantially perpendicular inwardly. After the insertion of the tank insert unit 14 from below into the fuel container 12, the wall portion 38 forms the auxiliary container 27 which corresponds to the auxiliary container 27 of FIG. 1. It is necessary that the tank flange 18 abuts with its edge zone 37 against the edge region 36 of the opening 26 of the fuel container 12.

The pump 28 is arranged in the wall portion 38 and feeds fuel into the auxiliary container 27. The fuel feeding aggregate 17 is preferably received by the holding element 19 and the holders 21, since the auxiliary container 27 is formed by the wall portion 38.

It will be understood that each of the elements described above, or two or more together, may also find a useful application in other types of constructions differing from the types described above.

While the invention has been illustrated and described as embodied in a fuel supply device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fuel supply device, comprising a container from which fuel is to be supplied to an internal combustion engine; a receptacle; a fuel feeding aggregate arranged on said receptacle; connecting means for receiving electrical and hydraulic connecting elements, said fuel container having a lower side provided with an opening, said fuel feeding aggregate being insertable in said opening of said lower side of said fuel container, said receptacle which supports said fuel feeding aggregate being provided with a tank flange formed as a tank insertion unit and insertable from below into said opening of said fuel container, said opening of said fuel container having an inwardly extending wall portion which, in an inserted condition of said tank unit, forms an auxiliary container surrounding said fuel feeding aggregate, said auxiliary container being formed as an upwardly open overflow trough.

2. A device as defined in claim 1, wherein said auxiliary container is provided on said tank flange and extends at least partially over a length of said fuel feeding aggregate.

3. A device as defined in claim 2, wherein said auxiliary container is provided with a pump which feeds fuel from said supply container into said auxiliary container.

4. A device as defined in claim 1, wherein said opening of said fuel container has an edge region which extends back relative to said lower side by a thickness of said tank flange and adjoins said opening.

* * * * *